(12) United States Patent
Makino

(10) Patent No.: US 8,753,052 B2
(45) Date of Patent: Jun. 17, 2014

(54) BLIND RIVET

(75) Inventor: Takanori Makino, Toyohashi (JP)

(73) Assignee: Newfrey LLC, Newark, DE (US)

( * ) Notice: Subject to any disclaimer, the term of this patent is extended or adjusted under 35 U.S.C. 154(b) by 177 days.

(21) Appl. No.: 12/942,357

(22) Filed: Nov. 9, 2010

(65) Prior Publication Data

US 2011/0129317 A1 Jun. 2, 2011

(30) Foreign Application Priority Data

Nov. 11, 2009 (JP) .................................. 2009-258088

(51) Int. Cl.
*F16B 19/10* (2006.01)

(52) U.S. Cl.
CPC .................................. *F16B 19/1054* (2013.01)
USPC ........................................................... 411/43

(58) Field of Classification Search
USPC .......................................... 411/34, 35, 43, 70
See application file for complete search history.

(56) References Cited

U.S. PATENT DOCUMENTS

| | | | |
|---|---|---|---|
| 2,533,448 A * | 12/1950 | Forman et al. ................... | 411/70 |
| 2,756,624 A | 7/1956 | Austin | |
| 2,954,718 A * | 10/1960 | Brilmyer ......................... | 411/70 |
| 3,279,303 A * | 10/1966 | Shackelford et al. ........... | 411/49 |
| 3,286,580 A | 11/1966 | Harvey | |
| 3,880,042 A * | 4/1975 | Binns .............................. | 411/43 |
| 4,585,383 A | 4/1986 | Ludwig | |
| 4,913,609 A * | 4/1990 | Mauer ............................. | 411/43 |
| 5,102,274 A | 4/1992 | Norton | |
| 5,286,151 A * | 2/1994 | Eshraghi ......................... | 411/43 |
| 6,905,296 B2 * | 6/2005 | Millington ...................... | 411/48 |

FOREIGN PATENT DOCUMENTS

| | | |
|---|---|---|
| GB | 1392601 A | 4/1975 |
| JP | 6-147208 A | 5/1994 |

OTHER PUBLICATIONS

European Search Report dated Sep. 21, 2012 for corresponding EP Application No. 10190613.9.

* cited by examiner

*Primary Examiner* — Flemming Saether
(74) *Attorney, Agent, or Firm* — Michael P. Leary

(57) ABSTRACT

A head is formed so that the maximum diameter portion as viewed from the front is arranged in a different position axially with respect to the maximum diameter portion as viewed from the side. The horizontal cross-section of the head is such that a first ellipse is formed in the maximum diameter portion, and a second ellipse is formed in the maximum diameter portion with the long axis perpendicular to the long axis of the first ellipse. The horizontal cross-sectional shape of the head is gradually changed in the axial direction so as to continue from the first ellipse to the second ellipse. Each one of the horizontal cross-sections has the same circumferential length at different axial positions on the head.

13 Claims, 8 Drawing Sheets

BLIND RIVET

CROSS-REFERENCE TO RELATED APPLICATIONS

This application claims the benefit of Japanese Application No. 2009-258088 filed Nov. 11, 2009, the disclosure of which is incorporated herein by reference.

BACKGROUND OF THE INVENTION

The present invention relates to a blind rivet and, more specifically, to a blind rivet able to keep the broken mandrel portion attached to the rivet from dropping off the rivet body after fastening.

A blind rivet comprises a rivet body consisting of a hollow sleeve and a hollow flange formed at one end of the sleeve with a larger diameter than the sleeve, and a mandrel consisting of a shaft portion extending from beyond the flange through the rivet body and a head integrally connected to the shaft portion with a diameter greater than the inner diameter of the sleeve arranged adjacent to the sleeve end on the side opposite that of the flange. During the blind rivet fastening operation, the shaft portion of the mandrel extending from the rivet body is inserted and held in the nose of the fastening tool. The rivet body with the mandrel passing through is inserted with the mandrel head in front into the attachment hole of the attached component aligned with the attachment hole of the attached member. When the mandrel head is sticking out of the rear surface of the attached member and the flange on the rivet body has come into contact with the attached component, the mandrel shaft extending from the flange on the attached component side is forcibly drawn out by the operation of the fastening tool until it breaks off. The forcible drawing of the mandrel shaft causes the mandrel head to pull the sleeve portion on the rear surface of the attached member towards the flange side. A portion of the sleeve (for example, the portion at the end near the mandrel head) expands outward radially and is deformed. The attached member and the attached component are interposed between the flange and the expanded and deformed portion of the sleeve, and the attached member and the attached component are fastened by the blind rivet. This fastening operation joins the attached component to the attached member.

Because the mandrel shaft portion of the broken mandrel held by the fastening tool is accommodated in the fastening tool in order to expand and deform the sleeve, this portion can be discarded from the fastening tool at a location away from the attached member at the end of the fastening operation. However, the broken shaft portion of the mandrel remains with the head on the rivet body connected to the attached member. Because the mandrel portion is not connected to the rivet body, gravity often causes it to drop off the rivet body. The mandrel shaft portion attached to the dropped off mandrel can contact the rear surface of the attached member, making noise and sometimes damaging the rear surface of the attached member. Therefore, the mandrel portion attached to the broken off rivet should be kept from dropping off the rivet body.

A particular blind rivet that attempts to overcome this problem is described in Patent Document 1, Japanese Published Unexamined Patent Application No. 6-147208 and in Patent Document 2, U.S. Pat. No. 2,756,624 and also in Patent Document 3, U.S. Pat. No. 5,102,274. In using this rivet, the broken off mandrel portion attached to the head has a head with a shape that keeps it from dropping off the rivet body. In the blind rivet of Patent Document 1 and Patent Document 2, the mandrel head has a shape with a nearly round horizontal cross-section in the root portion adjacent to the mandrel shaft and an oval-shaped horizontal cross-section in the tip portion. The end of the sleeve on the rivet body expanded and deformed by the mandrel head is first expanded and deformed into a round shape by the head portion which has a round horizontal cross-section. However, it is then deformed into an oval shape from the round shape by the expanded and deformed end of the sleeve, and finally into a shape in which the pair of long sides on the oval move closer to each other to cover the end surface of the rivet. The deformation causes the end surface of the broken mandrel head to be covered by the deformed portion of the end surface of the sleeve, and the mandrel portion attached to the broken rivet is kept from dropping off the rivet body.

The blind rivet in Patent Document 1 and Patent Document 2 can keep the broken mandrel portion attached to the rivet from dropping off the rivet body. However, when the head portion with a round horizontal cross-section in the blind rivet of Patent Document 1 and Patent Document 2 is deformed from a round horizontal cross-section to an oval-shaped horizontal cross-section by the sleeve which is expanded and deformed into a round shape by the head portion with a nearly round horizontal cross-section, the sleeve end of the rivet body is expanded and deformed again which weakens the strength of the expanded and deformed sleeve portion. As mentioned earlier, the attached member and the attached component are interposed between the flange and the expanded and deformed portion of the sleeve, and the attached member and the attached component are fastened by the blind rivet. This fastening operation joins the attached component to the attached member. When the strength of the expanded and deformed portion of the sleeve is weakened, the fastening strength of the blind rivet is reduced. As a result, the joining strength of the attached member and the attached component is also reduced.

SUMMARY OF THE INVENTION

The object of the present invention is to provide a blind rivet that can keep the broken mandrel portion from dropping off the rivet body and that can maintain high fastening strength for the blind rivet.

In order to achieve this object, the present invention is a blind rivet comprising a rivet body consisting of a hollow sleeve and a hollow flange formed at one end of the sleeve with a larger diameter than the sleeve, and a mandrel consisting of a shaft portion extending through the flange and through the rivet body and a head integrally connected to the shaft portion with a diameter greater than the inner diameter of the sleeve arranged adjacent to the sleeve end on the side opposite that of the flange, an attached member and an attached component being fastened and joined together by expanding a portion of the sleeve on the rivet body passed through attachment holes in the attached member and the attached component, and interposing the attached member and the attached component between the expanded portion and the flange. The blind rivet of the present invention is characterized in that the head has a maximum diameter portion as viewed from the front formed in the root portion adjacent to the shaft portion, a maximum diameter portion as viewed from the side in a direction perpendicular to the view from the front formed on the side of the tip of the rivet, the maximum diameter portion as viewed from the front being formed in a different location axially than the maximum diameter portion as viewed from the side with the axis of the rivet being arranged vertically and the tip of the rivet facing downward, and in that the horizontal cross-section of the head has a first ellipse formed in the maximum diameter portion as viewed from the front, and a second ellipse formed in the maximum diameter portion as viewed from the side with the long axis thereof perpendicular to the long axis of the first ellipse, the horizontal cross-sectional shape of the head gradually changing in the axial direction so as to continue from the first ellipse to the second ellipse, each one of the horizontal cross-sections having the same circumferential length at different axial positions on the head.

As mentioned above, the head has a maximum diameter portion as viewed from the front formed in the root portion adjacent to the shaft portion, and a maximum diameter portion as viewed from the side in a direction perpendicular to the view from the front formed on the side of the tip of the rivet. Also, the horizontal cross-section of the head has a first ellipse formed in the maximum diameter portion as viewed from the front, and a second ellipse formed in the maximum diameter portion viewed from the side with the long axis thereof perpendicular to the long axis of the first ellipse, the horizontal cross-sectional shape of the head gradually changing in the axial direction so as to continue from the first ellipse to the second ellipse, each one of the horizontal cross-sections having the same circumferential length at different axial positions on the head. As a result, the end of the sleeve expanded and deformed by the rivet covers a portion of the surface at the tip of the rivet, keeping the broken mandrel portion attached to the rivet from dropping off the rivet body. Because the circumferential length of the rivet is set to keep the sleeve at a constant thickness while the sleeve is expanded and deformed, the fastening strength of the blind rivet can be maintained at a high level.

In another embodiment of the blind rivet, the head is formed in a semicircular shape as viewed from the front, the diameter becoming smaller from the root portion towards the tip, and the head is formed in a trapezoidal shape as viewed from the side, the short side being in the root portion and the long side being at the tip. This rivet has a pair of shoulders coming into contact with the sleeve end in the root portion as viewed from the front, and the rivet has a pair of inclined surfaces expanding outward radially from the root portion in the direction of the tip as viewed from the side. A triangular cut can be formed at the tip of the rivet in the portion forming a trapezoidal shape as viewed from the side. This saves on material costs and reduces the overall weight. In another embodiment of the blind rivet, the head is formed in a triangular shape as viewed from the front, the diameter becoming smaller from the root portion towards the tip, and the head is formed in a semicircular shape as viewed from the side, the diameter becoming larger from the root portion towards the tip. This rivet has a pair of curved shoulders coming into contact with the sleeve end in the root portion as viewed from the front, and the rivet has a pair of inclined surfaces expanding outward radially from the root portion in the direction of the tip as viewed from the side.

In still another embodiment of the blind rivet, the head is formed in a circular shape as viewed from the tip of the rivet on the bottom. Here, a mandrel consisting of a head and shaft can be fashioned from a round rod. In other words, the mandrel can be formed as simply as the prior art and any additional steps can be eliminated. In yet another embodiment of a blind rivet, two circumferential grooves are formed in the outer peripheral surface of the sleeve in different positions axially. This creates a second expanded and deformed portion between the two circumferential grooves in addition to the first expanded and deformed portion at the tip (bottom end) of the sleeve for more secure fastening. A single circumferential groove can also be formed.

BRIEF EXPLANATION OF THE FIGURES

FIG. 1 (A) is a front view of the blind rivet in the first embodiment, FIG. 1 (B) is a partial horizontal cross-sectional front view of the blind rivet showing a vertical cross-sectional front view of the body of the blind rivet in FIG. 1 (A), and FIG. 1 (C) is a partial horizontal cross-sectional side view of the blind rivet showing a vertical cross-sectional view of the body of the blind rivet in FIG. 1 (A).

FIG. 2 (A) is a partial horizontal cross-sectional front view of the blind rivet in FIG. 1 (B) after fastening, FIG. 2 (B) is a partial horizontal cross-sectional side view of the blind rivet in FIG. 1 (C) after fastening, and FIG. 2 (C) is a bottom view of the blind rivet in FIG. 2 (A).

FIG. 3 (A) is a front view of the head and shaft portion, FIG. 3 (B) is a side view of the head and shaft portion in FIG. 3 (A), FIG. 3 (C) is a bottom view of the head in FIG. 3 (A), and FIG. 3 (D) is a perspective view of the head and shaft portion of FIG. 3 (A).

FIG. 4 continues from graph (A) to graph (B). In the graph, the horizontal axis indicates the axial length of the head in mm units from the starting point at the boundary with the shaft towards the tip (the bottom end in FIG. 1), and the vertical axis indicates the circumferential length of the horizontal cross-section of the head in mm units. The various figures arranged horizontally at the top of graph (B) indicate the horizontal cross-sectional shape of the head at the position corresponding to the axial length of the head.

FIG. 5 (A) is a front view of the head and shaft portion, FIG. 5 (B) is a side view of the head and shaft portion in FIG. 5 (A), FIG. 5 (C) is a bottom view of the head in FIG. 5 (A), and FIG. 5 (D) is a perspective view of the head and shaft portion in FIG. 5 (A).

FIG. 7 (A) is a front view of the head and shaft portion, FIG. 7 (B) is a side view of the head and shaft portion in FIG. 7 (A), FIG. 7 (C) is a bottom view of the head in FIG. 7 (A), and FIG. 7 (D) is a perspective view of the head and shaft portion in FIG. 7 (A).

DETAILED DESCRIPTION OF THE PREFERRED EMBODIMENTS

Figure 3:
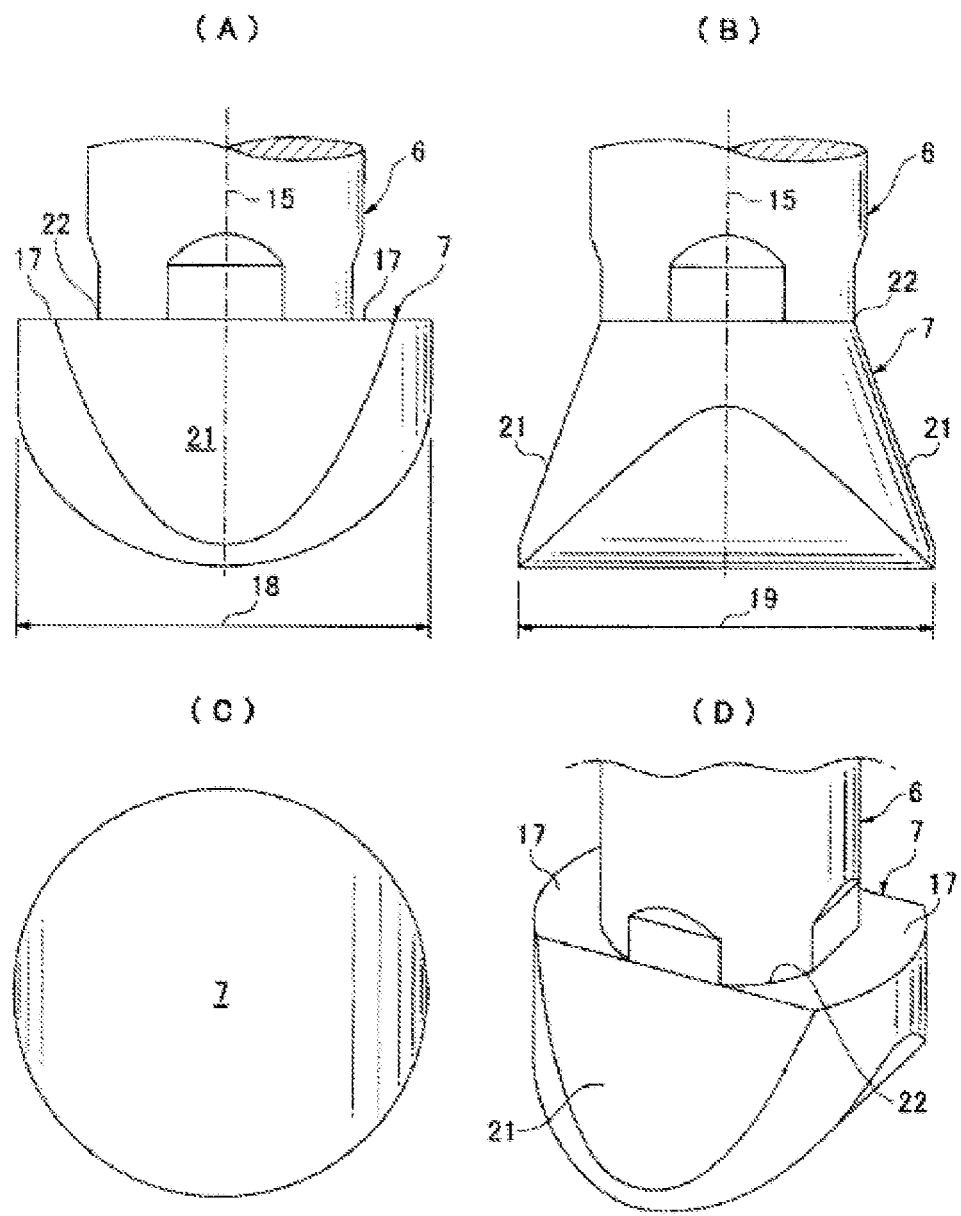
FIG. 3 shows the portion of the blind rivet in FIG. 1 with the head of the mandrel and the adjacent shaft portion.
Figure 4:
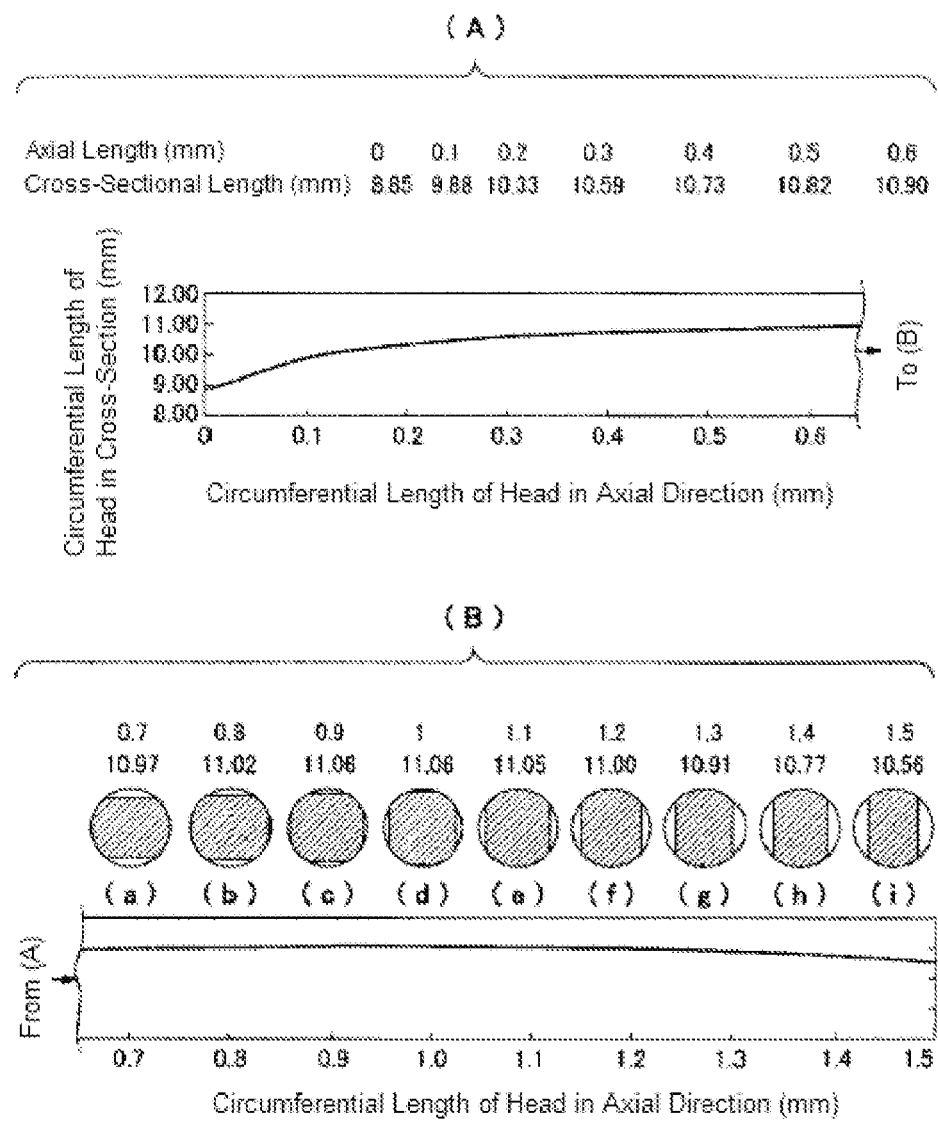
FIG. 4 is a graph showing the horizontal cross-sectional shapes and the circumferential lengths of the mandrel head in the blind rivet of FIG. 1 along the axial length of the head.
Figure 5:
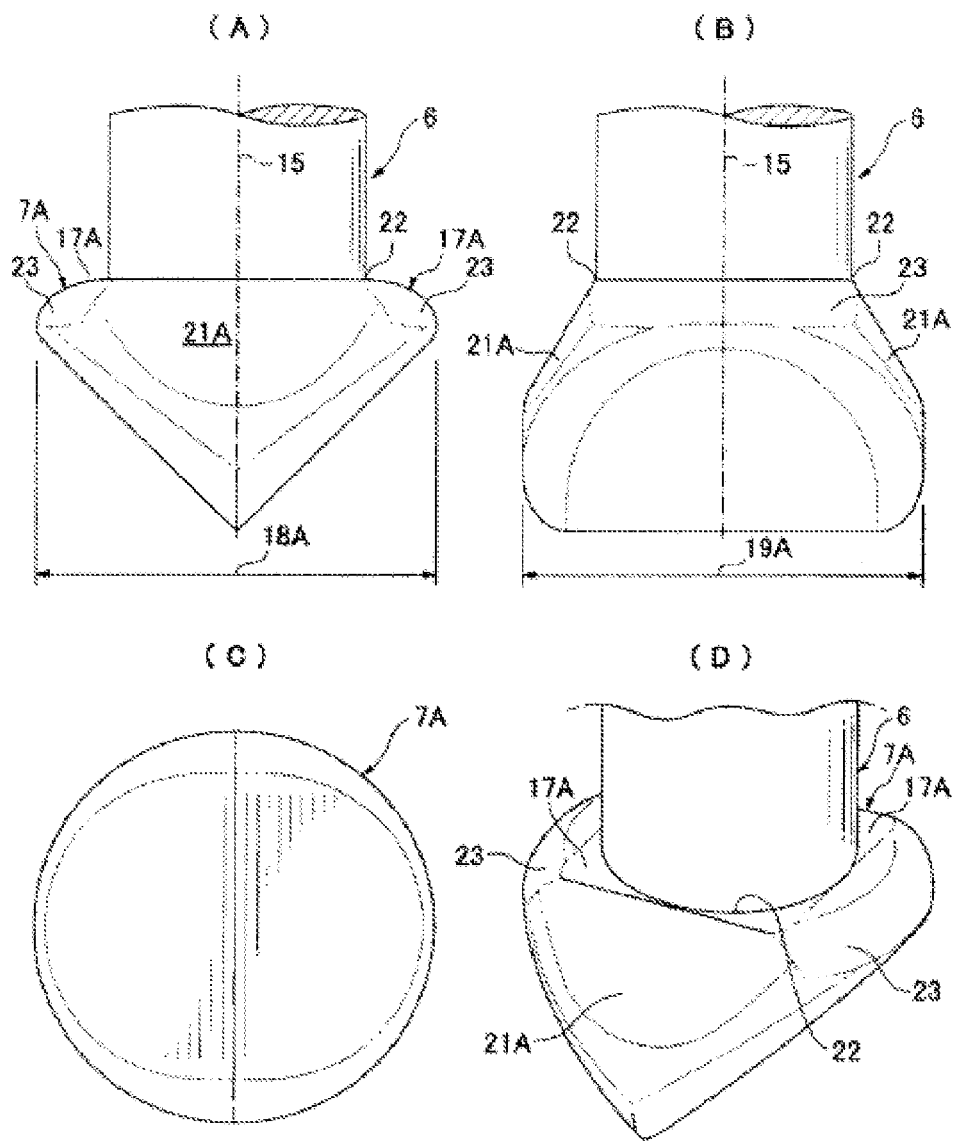
FIG. 5 shows the portion of the blind rivet in the second embodiment of the present invention containing the head of the mandrel and the adjacent shaft portion.
Figure 6:
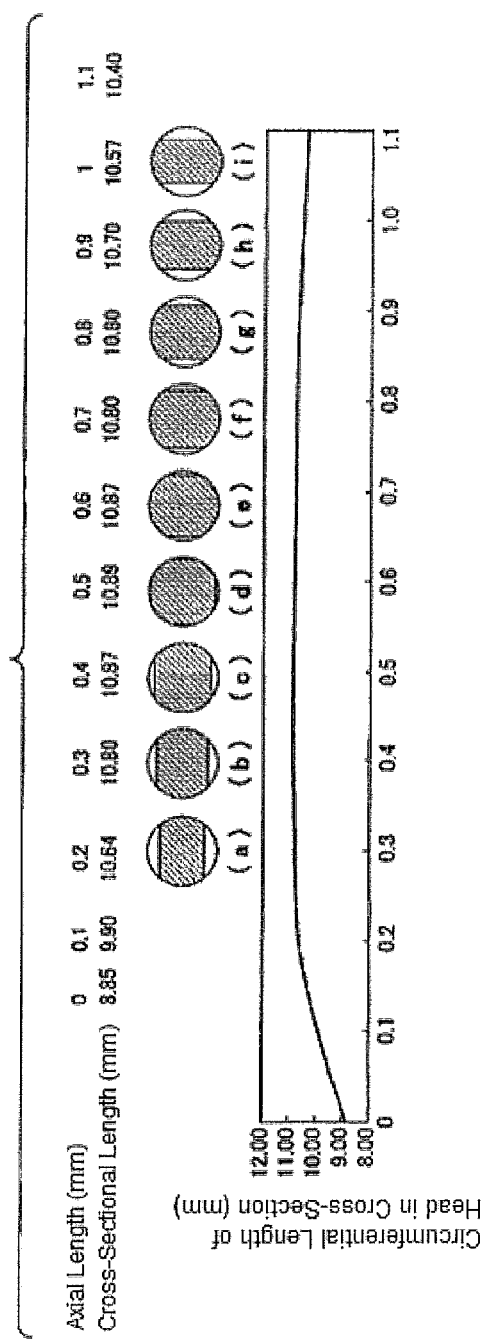
FIG. 6 is a graph showing the horizontal cross-sectional shapes and the circumferential lengths of the mandrel head in the blind rivet of FIG. 5 along the axial length of the head. In the graph, the horizontal axis indicates the axial length of the head in mm units from the starting point at the boundary with the shaft towards the tip, and the vertical axis indicates the circumferential length of the horizontal cross-section of the head in mm units. The various figures arranged horizontally at the top of graph indicate the horizontal cross-sectional shape of the head at the position corresponding to the axial length of the head.
Figure 7:
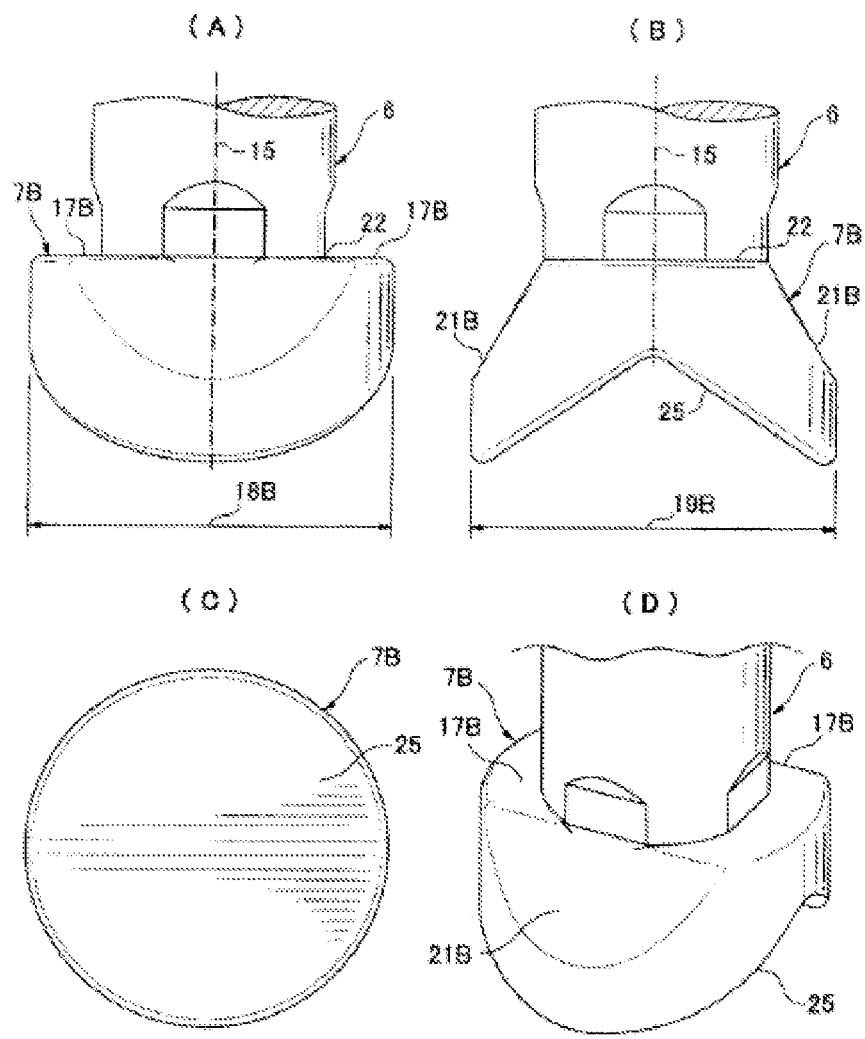
FIG. 7 shows the portion of the blind rivet in the second embodiment of the present invention containing the head of the mandrel and the adjacent shaft portion.
Figure 8:
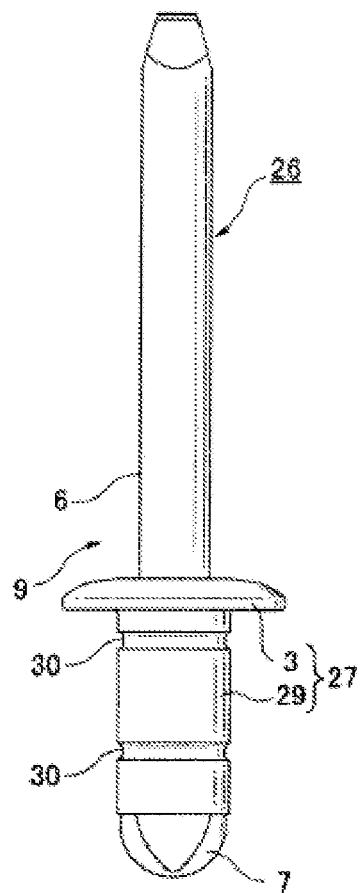
FIG. 8 is a front view of the blind rivet in the fourth embodiment of the present invention.

The following is an explanation of the blind rivets in embodiments of the present invention with reference to the figures. FIG. 1 through FIG. 4 show the blind rivet 1 in the first embodiment, the blind rivet 1 after being fastened, the head of the mandrel and the shaft portion of the mandrel adjacent to the head in the blind rivet 1 of the first embodiment, and how the horizontal cross-sectional shapes and the circumferential lengths change along the axial length of the mandrel head. FIG. 5 and FIG. 6 show the head of the mandrel and the shaft portion of the mandrel adjacent to the head in the blind rivet of the second embodiment, and how the horizontal cross-sectional shapes and the circumferential lengths change along the axial length of the mandrel head. FIG. 7 shows the head of the mandrel and the shaft portion of the mandrel adjacent to the head in the blind rivet of the third embodiment. FIG. 8 shows the blind rivet in the fourth embodiment.

Figure 1:
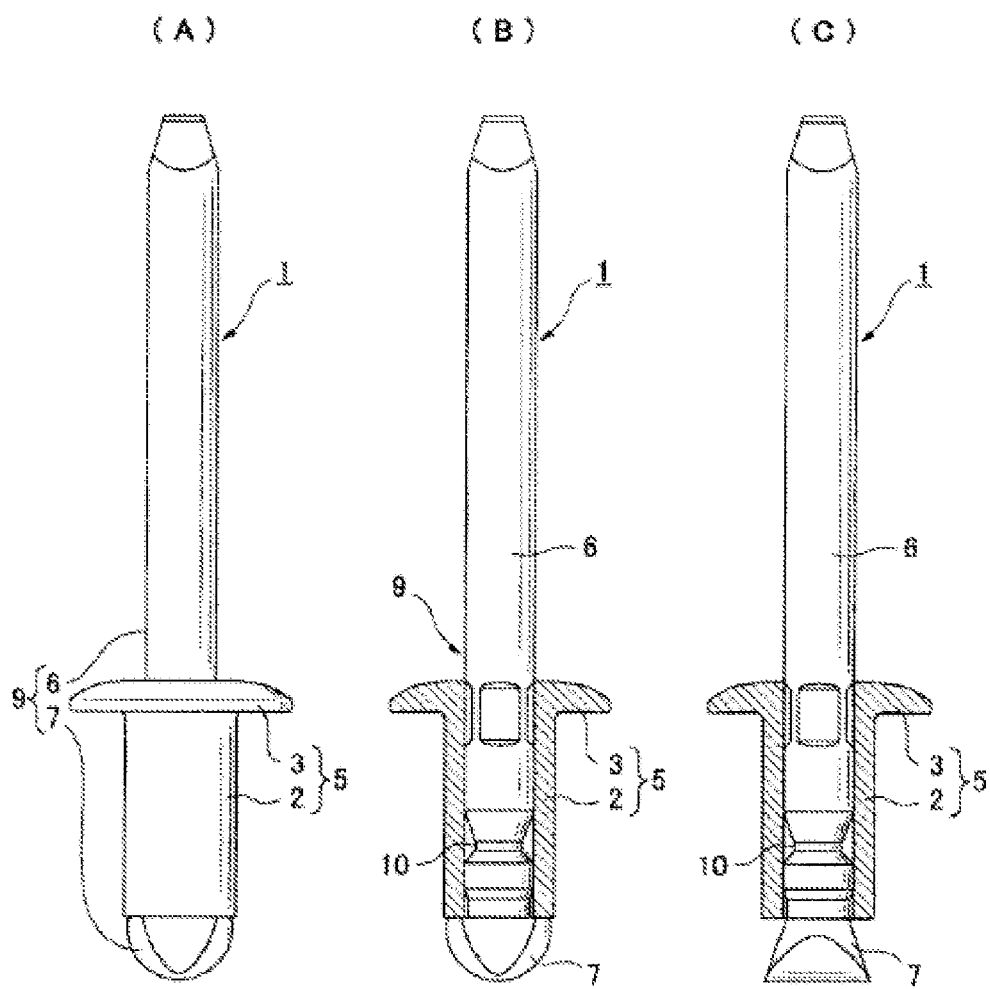
FIG. 1 shows the blind rivet in the first embodiment of the present invention.

The following is an explanation of the blind rivet in the first embodiment with reference to FIG. 1 through FIG. 4. FIGS. 1 (A) through (C) show the overall shape of the blind rivet 1. The blind rivet 1 comprises a rivet body 5 consisting of a hollow sleeve 2 and a hollow flange 3 formed at one end of the sleeve 2 with a larger diameter than the sleeve 2, and a mandrel 9 consisting of a shaft portion 6 extending from the flange 3 through the rivet body 5 and a head 7 integrally connected to the shaft portion 6 with a diameter greater than the inner diameter of the sleeve 2 arranged adjacent to the sleeve 2 end on the side opposite that of the flange 3. The rivet body 5 and the mandrel 9 are integrally formed of a metal material that is the same as that of conventional blind rivets. The two components, the rivet body 5 and the mandrel 9, as shown in FIGS. 1 (A) through (C), form a single component, a blind rivet 1, when the mandrel 9 is passed through the rivet body 5 in the assembly process. Examples of metal materials that can be used to form the mandrel 9 and the rivet body 5 include iron, stainless steel and aluminum.

As shown in FIGS. 1 (B) and (C), a breakable portion 10 with a diameter smaller than the rest of the shaft portion is formed in the shaft portion 5 of the mandrel 9 near the head 7. The breakable portion 10 is surrounded by the sleeve 2 of the rivet body 5 before being fastened, and is formed between the flange 3 and the head 7. The breaking strength of the breakable portion 10 is determined by the combination of the drawing force of the mandrel 9 and the expansion and deformation force of the sleeve 2 when the sleeve 2 is expanded and deformed by the head 7. The drawing force of the mandrel should not cause breakage until the attached member and the attached component are securely interposed between the flange 3 and the expanded and deformed portion of the sleeve 2. It should also not be excessive before the attached member and the attached component have been interposed.

Figure 2:
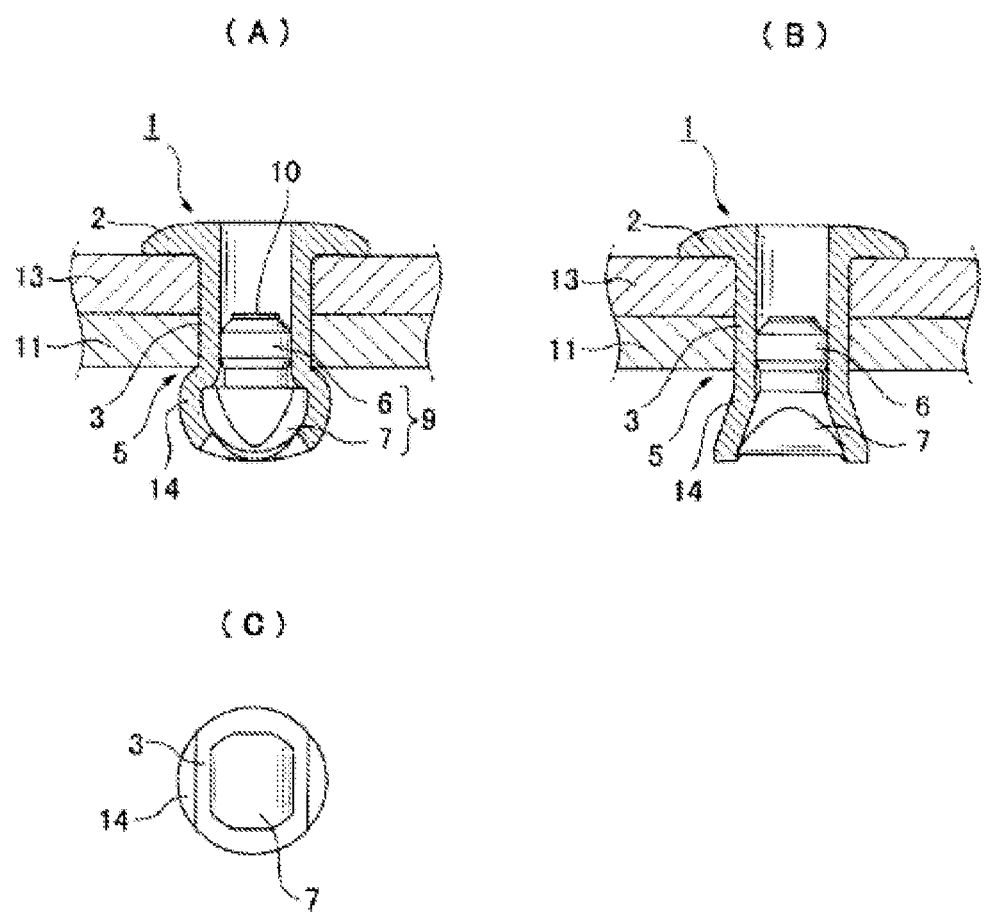
FIG. 2 shows an attached member and an attached component fastened together with the blind rivet in FIG. 1.

FIG. 2 shows the attached component 13 joined with the attached member 11 by the fastening of the blind rivet 1. During the blind rivet 1 fastening operation, the shaft portion 6 of the mandrel 9 extending from the flange 3 of the rivet body 5 is inserted by the operator and held in the nose of the fastening tool (not shown). Next, the rivet body 5 with the mandrel 9 passing though is inserted with the mandrel head 7 in front into the attachment hole of the attached component 13 aligned with the attachment hole of the attached member 11. The head 7 of the mandrel 9 sticks out of the rear surface of the attached member 11 and the flange 3 on the rivet body 5 comes into contact with the attached component 13. In this state, the operator operates the fastening tool and the shaft portion 6 of the mandrel 9 extending from the flange 3 on the side with the attached component 13 is drawn against the flange 3 until it breaks in the breakable portion 10. By forcibly drawing the shaft portion 6, the head 7 of the mandrel 9 is pressed strongly against the end of the sleeve 2, the head 7 is pulled into the portion of the sleeve 2 on the rear surface side of the attached component 11, and a portion of the sleeve 2 (i.e., the portion at the end of the sleeve 2 adjacent to the mandrel head 7) is deformed so as to expand radially, forming the expanded and deformed portion 14 shown in FIG. 2. Because the expanded and deformed portion 14 of the sleeve 2 is strongly pulled by the mandrel head 7 in the axial direction towards the sleeve 2, the attached member 11 making contact with the expanded and deformed portion 14 and the attached component 13 making contact with the flange 3 are firmly interposed working with the flange 3. Thus, the blind rivet 1, as shown in FIG. 2, interposes the attached member 11 and the attached component 13 between the expanded and deformed portion 14 of the sleeve 2 and the flange 3, the attached member 11 and the attached component 13 are fastened, and the attached member 11 and the attached component 13 are joined by the fastening operation.

The blind rivet 1 has a head 7 with a shape that keeps the broken mandrel portion with the head attached from dropping off the rivet body 5. See FIG. 3. In FIGS. 3 (A) and (B), the head 7 is aligned in the axial direction (vertically in the figure) with the root portion, or the boundary portion 22 with the shaft portion 6.

As shown in the front view in FIG. 3 (A), a pair of shoulders 17 is formed in the head 7 at the boundary portion 22 with the shaft portion 6 (i.e., in the root portion) diametrically facing the plane perpendicular to the axis 15 of the head 7 extending upward (i.e., the mandrel 9 including the shaft portion 6). Because the head 7 is aligned in the axial direction (vertically in the figure) with respect to the boundary portion 22 with the shaft portion 6 in FIGS. 3 (A) and (B), the shoulders 17 in FIGS. 3 (A) and (B) are shown at the same axial height. For example, the head 7 can be obtained by machining a round rod with a diameter corresponding to the diameter of the shoulders 17 into the predetermined shape [see FIG. 3 (D)].

In the front view [FIG. 3 (A)], the diameter of the head 7 is reduced (constricted) from the shoulders 17 towards the bottom end (i.e., the tip) with the tip of the head 7 extending vertically along the axis 15 of the head 7 facing downward. In the side view [FIG. 3 (B)], the head has a trapezoidal shape with a diameter shorter at the upper end (which is substantially the same as the shaft portion 6) and a diameter longer at the tip or lower end (which is substantially the same as the portion with the shoulders 17). In the bottom view in FIG. 3 (C), the shape as viewed from the bottom end (tip) is nearly as round as a round rod. In the head 7, the maximum diameter portion 19 in the side view [FIG. 3 (B)] has substantially the same diameter as the maximum diameter portion 18 in the front view [FIG. 3 (A)]. In the figures, the maximum diameter portion 18 as viewed from the front and the maximum diameter portion 19 as viewed from the side are staggered positionally along the axis 15. A pair of inclined surfaces 21 is formed in which the radius increases outward radially from the boundary portion 22 towards the bottom end (top) in the diametrical direction as viewed from the side and perpendicular to the pair of shoulders 17 facing them in the perpendicular direction. The length of the maximum diameter portion 18 (and maximum diameter portion 19) is selected to firmly interpose the attached component and the attached member between the flange 3 and the portion of the sleeve 2 expanded and deformed by the maximum diameter portion 18 (and maximum diameter portion 19) and to expand and deform the sleeve 2 enough to maintain the strength of the sleeve 2. In the other embodiments, it is selected in the same manner.

As mentioned above, the maximum diameter portion 18 as viewed from the front [FIG. 3 (A)] and the maximum diameter portion 19 as viewed from the side [FIG. 3 (B)] are staggered along the axis 15 with the maximum diameter portion 18 along the upper portion of the axis 15 and the maximum diameter portion 19 along the lower portion of the axis 15. The horizontal cross-sectional shape of the head 7 changes along the axis of the head 7 from a first ellipse formed in the portion with the maximum diameter portion 18 as viewed from the front [FIG. 3 (A)] to a second ellipse with the long axis perpendicular to the long axis of the first ellipse formed in the portion with the maximum diameter portion 19 as viewed from the side [FIG. 3 (B)]. The horizontal cross-sectional shape of the head 7 is shown in FIG. 4 (B). The horizontal cross-section of the head 7 is formed so that the circumferential length is the same at different positions along the axis.

In the fastening operation of the blind rivet 1, first, the end of the sleeve 2 of the rivet body 5 expanded and deformed by the head 7 of the mandrel 9 is drawn through the shaft portion 6 of the mandrel from the fastening tool, and is subjected to strong axial deformation force from the pair of shoulders 17 on the head 7. The pair of inclined surfaces 21 facing the pair of shoulders 17 in the perpendicular direction are embedded inside the sleeve 2. The pair of inclined surfaces 21 embedded inside the sleeve 2 deforms the end of the sleeve 2 in the portion with the inclined surfaces 21 so as to make it smaller radially. The strong axial deformation force sustained from the pair of shoulders 17 expands and deforms the end of the sleeve 2 outward radially as the radius grows to accept the shoulders 17. This expansion and deformation pushes the head 7 inside from the end of the sleeve 2 and moves axially. The inside of the sleeve 2 is deformed outward radially in accordance with the horizontal cross-sectional shape of the head 7. For this deformation, see also the horizontal cross-sectional shape of the head 7 in FIG. 4.

The horizontal cross-sections of the rivet 7 producing this deformation are rendered at the top of the graph in FIG. 4 (B) at the various locations corresponding to the moving length of the rivet 7 along the horizontal axis of the graph. As shown in FIG. 4 (B), in the horizontal cross-sectional shape (a) corresponding to the first ellipse in the head 7, the expansion and deformation from the pair of shoulders 17 are parallel. As the head 7 moves upward in FIG. 1, the horizontal cross-sectional shape of the head 7 positioned at the end of the sleeve 2 changes to shapes (b), (c) and (d). As the shape changes, the end of the sleeve 2 also changes to shapes (b), (c) and (d). Because at horizontal cross-sectional shape (e) of the head 7, the diameter of the portion at the inclined surfaces 21 formed in the trapezoidal shape as viewed from the side [FIG. 3 (B)] is substantially the same as the diameter of the portion formed in a round shape as viewed from the front [FIG. 3 (A)], the deformed portion of the sleeve 2 is somewhat square and round. When this position is passed, the horizontal cross-sectional shape of the head 7 changes to shapes (f), (g) and (h) as it approaches the second ellipse (i). As a result, the long sides formed by the trapezoid shape as viewed from the side [FIG. 3 (B)] act to deform it into an elliptical shape that is long in the perpendicular direction. When the horizontal cross-sectional shape (k) [sic] of the head 7 reaches its final horizontal cross-sectional shape (i) corresponding to the second ellipse, the end portion of the sleeve 2 has been expanded and deformed into an elliptical shape that is long in the perpendicular direction and short in the horizontal direction. The pair of long side portions facing in the horizontal direction ride over the tip or bottom end of the head portion formed into a semi-circular shape as viewed from the front [FIG. 3 (A)] and cause deformation inside as shown by expanded and deformed portion 14 in FIG. 2 (A). In other words, the pair of long side portions of the ellipse in the deformed portion of the deformed sleeve 2 are deformed into a shape in which they nearly come into contact with each other and cover the end surface of the head 7. This keeps the broken mandrel shaft 6 with the attached head 7 from dropping off the rivet body 5.

The head 7 has a semicircular shape in which the diameter becomes reduced (constricted) from the shoulders 17 to the tip (lower end) as viewed from the front [FIG. 3 (A)], and has a trapezoid shape in which the diameter is about the same as the shaft portion 6 at the top end and in which the diameter is larger at the lower end or tip (about the same diameter as the shoulder portions 17) as viewed from the side [FIG. 3 (B)]. As shown in the bottom view in FIG. 3 (C), the shape viewed from the tip (lower end) is nearly round, and the diameter of the large diameter portion 18 as viewed from the front [FIG. 3 (A)] is nearly the same as the diameter of the larger diameter portion 19 as viewed from the side [FIG. 3 (B)]. As mentioned earlier, the mandrel 9 can be formed from a round rod. This is machined so that the portion of the head 7 has a diameter that is larger than the shaft portion 6 so as to form the shoulder portions 17, a breakable portion 10 is formed in a part of the shaft portion 6, and the head 7 is given a semicircular shape and trapezoidal shape. In this way, a mandrel with a head 7 can be manufactured in a single step, and the number of steps needed to form the head is the same as a mandrel of the prior art. This means costs are not increased.

In the head 7, the circumferential length of the horizontal cross-section of the head 7 is nearly the same at each position along the axial direction of the head 7. In the head of the mandrel for the blind rivet of the first embodiment shown in FIG. 4 (A) and (B), the axial length of the head is 2 mm. The circumferential lengths of the horizontal cross-sections along the axis between 0.1 mm and 1.5 mm are in the 9.00 mm to 11.00 mm range or approximately 11.00 mm. More specifically, the circumferential lengths of the horizontal cross-sections of the head 7 along the axis between 0.0 mm and 0.2 mm are between 9.00 mm and 10.00 mm, and the circumferential length of the horizontal cross-sections of the head along the axis between 0.5 mm and 1.4 mm is approximately 11.00 mm. Because the inner circumferential length of the expanded and deformed portion at the end of the sleeve 2 is fixed, deterioration in the strength of the sleeve in the expanded and deformed portion can be prevented, the strength of the expanded and deformed portion can be maintained, and the fastening strength of the blind rivet can be kept constant. As a result, the strength joining the attached component 13 to the attached member 11 can be kept constant and high fastening strength can be maintained. Also, the circumferential lengths in the head 7 a short distance axially from the boundary portion 22 with the shaft portion 6 is shorter than the circumferential lengths at a greater distance. As a result, the head 7 is easily inserted into the sleeve 2 at the beginning of the expansion and deformation at the end of the sleeve 2, and the expanding and deforming is easier to achieve.

FIG. 5 and FIG. 6 show the head 7A of the mandrel in the blind rivet of the second embodiment. In FIGS. 5 (A) and (B), the boundary portion 22 with the shaft portion 6 is aligned with the head 7A in the axial position (vertically in the figure). As shown in the front view of FIG. 5 (A), a pair of shoulders 17A is formed in the head 7A at the boundary portion 22 with the shaft portion 6 diametrically with respect to the horizontal plane which is perpendicular to the vertical axis 15. As in the case of head 7, head 7A is obtained by machining a round rod to a predetermined shape. In head 7A, the shoulders have a somewhat different shape than the shoulders 17 in head 7. The outermost peripheral portion is formed into curved shoulders 17A with fillets (roundness) 23. This makes it easier to insert the head 7A into the sleeve 2 at the beginning the expanding and deforming at the end of the sleeve 2 and the expanding and deforming of the sleeve 2 can begin more easily. The head 7A is formed so that the triangle-shaped diameter is reduced (constricted) from the curved shoulders 17A and the fillets 23 towards the bottom end (tip) as viewed from the front [FIG. 5 (A)], and so that the upper end has a semicircular shape that is reduced or constricted as viewed from the side [FIG. 5 (B)]. As shown in the bottom view in FIG. 5 (C), the shape of the head 7A when viewed from the bottom end (i.e., from the tip) is nearly as round as a round rod, and the diameter of the maximum diameter portion 18A as viewed from the front [FIG. 5 (A)] is nearly the same as the diameter of the maximum diameter portion 19A as viewed from the side [FIG. 5 (B)]. Maximum diameter portion 18A and maximum diameter portion 19A are staggered positionally along the axis 15. Also, a pair of inclined surfaces 21A are formed in the diametrical direction perpendicular to the pair of shoulders 17A opposing them in the diametrical direction. The diameter of these surfaces increases radially from the boundary portion towards the bottom end (tip).

In the case of head 7A, as in the case of head 7, the shape of the horizontal cross-section of the head 7A changes continually along the axis of the head 7A from a first ellipse formed in the portion with the maximum diameter portion 18A as viewed from the front [FIG. 5 (A)] to a second ellipse with a long axis perpendicular to the long axis of the first ellipse formed in the portion with the maximum diameter portion 19A as viewed from the side [FIG. 5 (B)]. The shapes of the horizontal cross-sections of the head 7A are shown in FIG. 6. The horizontal cross-sections of the head 7A are formed with the same circumferential length at the different positions in the axial direction.

During the fastening operation, the end of the sleeve 2 to be expanded and deformed by the head 7A of the mandrel 9 is subjected to strong axial deforming force from the pair of shoulders 17A on the head 7A as the shaft portion 6 is drawn from the fastening tool, and the pair of inclined surfaces 21A opposing the pair of shoulders 17A orthogonally are submerged inside the sleeve 2. The portion with the pair of inclined surfaces 21A can be deformed so that the radius at the end of the sleeve 2 becomes smaller, and the portion with the pair of shoulders 17A is expanded and deformed radially outward so that the radius at the end of the sleeve 2 can receive the shoulders 17A. The head 7A moves upward radially inside the sleeve 2, and the inside of the sleeve 2 is deformed outward radially by the cross-sectional shape of the head 7A.

The horizontal cross-sections of the rivet 7A producing this deformation are rendered at the top of the graph in FIG. 6 at the various locations corresponding to the moving length of the rivet 7A along the horizontal axis of the graph. As shown in FIG. 6, in the horizontal cross-sectional shape (a) corresponding to the first ellipse in the head 7A, the expansion and deformation of the end of the sleeve 2 by the pair of shoulders 17A is in the horizontal direction. As the head 7A moves above the shaft portion 15 (upward in FIG. 1), the end of the sleeve 2 is deformed by the horizontal cross-sectional shape of the head 7A changing to shapes (b), (c) and (d). At the horizontal cross-sectional shape (e) of head 7A, the diameter of the portion with the inclined surface 21A as viewed from the side [FIG. 5 (B)] is nearly the same as the diameter as viewed from the front [FIG. 6 (A)]. In other words, the deformed portion of the sleeve 2 is somewhat square and round. When the head 7A passes this position, the horizontal cross-sectional shape of the head 7A changes to shapes (f), (g) and (h). The portion with the semi-circular shape as viewed from the side [FIG. 6 (B)] acts to deform the sleeve 2 into an elliptical shape that is long in the perpendicular direction. The expansion and deformation of the sleeve 2 moves through the shape of horizontal cross-section (h) of the head 7A to the final shape of horizontal cross-section (i). When the end of the sleeve 2 is deformed to the shape corresponding to cross-sectional shape (i) with the second ellipse in head 7A, it has been expanded and deformed into an elliptical shape that is long in the perpendicular direction and short in the horizontal direction. As indicated by the expanded and deformed portion 14 in FIG. 2 (A), the bottom end or tip of the head 7A rides over and deforms the sleeve from the inside. The pair of long sided portions of the ellipse in the deformed sleeve portion are deformed so as to come closer to each other and cover the end surface of the head 7 [sic]. The end surface of the head 7A is covered by the deformed portion at the end surface of the sleeve 2, and the broken mandrel shaft 6 with the attached head 7 [sic] is kept from falling off the rivet body 5.

In the second embodiment, the head 7A has a nearly round shape as viewed from the tip (end) in the bottom view of FIG. 5 (C). In other words, the diameter of the maximum diameter portion 18A as viewed from the front [FIG. 5 (A)] is nearly the same as the diameter of the maximum diameter portion 19A as viewed from the side [FIG. 5 (B)]. Therefore, the mandrel can be formed out of a round rod. This is machined so that the shaft portion 6 has a small diameter, the portion with the head 7A has a larger diameter than the shaft portion 6 so as to form shoulders 17A, a breakable portion is formed in a section of the shaft portion 6, and the head 7A has a triangular shape as viewed from the front and a semi-circular shape as viewed from the side. As a result, the number of steps needed to form the head 7A is the same as a conventional mandrel, and there is no increase in cost.

In the head 7A, the circumferential length of the horizontal cross-section of the head 7A is nearly the same at each position along the axial direction of the head 7A. In the head of the mandrel for the blind rivet of this embodiment shown in FIG. 6, the axial length of the head is 2.3 mm. The circumferential lengths of the horizontal cross-sections along the axis between 0.1 mm and 1.5 mm are in the 9.00 mm to 11.00 mm range or approximately 11.00 mm. More specifically, the circumferential lengths of the horizontal cross-sections of the head 7A along the axis between 0.0 mm and 0.2 mm are between 9.00 mm and 11.00 mm, and the circumferential length of the horizontal cross-sections of the head along the axis between 0.3 mm and 1.1 mm is approximately 11.00 mm. Because the inner circumferential length of the expanded and deformed portion at the end of the sleeve 2 is fixed, deterioration in the strength of the sleeve in the expanded and deformed portion can be prevented, the strength of the expanded and deformed portion can be maintained, and the fastening strength of the blind rivet can be kept constant. As a result, the strength joining the attached component 13 to the attached member 11 can be kept constant and high fastening strength can be maintained. The head 7A has fillets 23 and the circumferential lengths a short distance axially from the boundary portion 22 with the shaft portion 6 is shorter than the circumferential lengths at a greater distance. As a result, the head 7A is easily inserted into the sleeve 2 at the beginning of the expansion and deformation at the end of the sleeve 2, and the expanding and deforming is easier to achieve.

FIG. 7 shows the head 7B of the mandrel in the blind rivet of the third embodiment. In FIGS. 7 (A) and (B), the head 7B is described as being aligned axially (along the axis 15) with the boundary portion 22 with the shaft portion 6. Head 7B nearly has the same shape as the head 7 in the first embodiment. However, the shape as viewed from the side [FIG. 7 (B)] is not trapezoidal like the head 7. Instead, a triangle-shaped lightening cut 25 is formed in the lower portion (tip). In order to maintain the strength on the lower end (tip) of the head 7B, the cut 25 does not have to be triangular. Even a round lightening cut can be made in the lower end (tip) of the head 7B. As shown in the front view of FIG. 7 (A), a pair of shoulders is formed. As shown in the front view of FIG. 7 (A), a pair of shoulders 17B is formed in the head 7B at the boundary portion 22 with the shaft portion 6 facing a plane diametrically which is orthogonal horizontally to the vertical axis 15. The head 7B is obtained by machining a round rod to a predetermined shape. The head 7B is formed so that the semi-circular diameter is constricted from the shoulders 17B towards the bottom end (tip) as viewed from the front [FIG. 7 (A)], and so that the bottom end of a trapezoidal shape that is short on the top end and long on the bottom end includes a cut 25 [FIG. 5 (B)] [sic]. As shown in the bottom view in FIG. 7 (C), the shape of the head 7B when viewed from the bottom end (i.e., from the tip) is nearly as round as a round rod, and the diameter of the maximum diameter portion 18B as viewed from the front [FIG. 7 (A)] is nearly the same as the diameter of the maximum diameter portion 19B as viewed from the side [FIG. 5 (B)] [sic]. Maximum diameter portion 18B and maximum diameter portion 19B are staggered positionally along the axis 15. The shape of the head changes from a first ellipse formed in the portion with the maximum diameter portion 18B to a second ellipse with the long axis perpendicular to the long axis of the first ellipse formed in the portion with the maximum diameter portion 19B as viewed from the side. Also, a pair of inclined surfaces 21B with a radius that increases from the boundary portion 22 towards the bottom end (tip). In the case of head 7B, in the case of head 7, the circumferential lengths of the horizontal cross-sections of the head 7B are nearly the same at the various positions along the axis of the head 7B. Therefore, in the head 7B after the fastening operation, the end surface of the head 7B is covered by the deformed portion at the end surface of the sleeve 2, and the broken head 7B and shaft portion 6 are kept from dropping off the rivet body 5.

Also, the inner circumferential length of the expanded and deformed portion at the end of the sleeve 2 is fixed, the strength from the expansion and deformation of the sleeve is fixed, deterioration in the strength of the sleeve from the increased expansion and deformation is prevented, the strength of the expanded and deformed portion is fixed, and the fastening strength of the blind rivet is fixed. As a result, the strength joining the attached component 13 to the attached member 11 is fixed, and high fastening strength can be maintained. By forming a cut 25, the amount of material in the rivet portion and the weight of the rivet portion can be reduced.

FIG. 8 shows the blind rivet 26 in the fourth embodiment of the present invention. Here, two circumferential grooves 30 are formed on the outer periphery of the sleeves 29 on the rivet body 27 at different positions axially. There are two circumferential grooves 30 in the example shown in the figure. However, one circumferential groove can be formed or many more circumferential grooves can be formed. Because the rest of the configuration is the same as the blind rivet 1 shown in FIG. 1 through FIG. 4, further explanation is omitted. In the fastening operation, the two circumferential grooves 30 shown in the figure are added to the expanded and deformed portion 14 in FIG. 21 to form one more expanded and deformed portion in the portion of the sleeve 29 between the two circumferential grooves. As a result, the second expanded and deformed portion between the two circumferential grooves is added to the first expanded and deformed portion at the tip (bottom end) of the sleeve 29 in the axial direction for more reliable fastening. Two expanded and deformed portions can be added to the sleeve even when one circumferential groove is used.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A blind rivet for use in fastening two or more components together, the blind rivet comprising: a rivet body having a hollow sleeve and a flange located at a top end of the sleeve, and a mandrel defining a long axis and comprising a shaft portion extending from beyond the flange through the rivet body and a head integrally connected to the shaft portion, the head having a diameter greater than the inner diameter of the sleeve and being arranged adjacent to the sleeve at a bottom end of the sleeve opposite the flange;

wherein the head of the mandrel defines a first maximum diameter in a first portion formed in a tip end distal from the shaft portion, and defines a second maximum diameter in a second portion formed on a root end proximal to the shaft portion and opposite to the tip end, the first maximum diameter perpendicular to and axially spaced from the second maximum diameter; and a first plan view of the head along the first maximum diameter displays a first concave curve open in the direction of the root end, the first concave curve defining a first boundary between a first head surface and a second head surface, and a second plan view of the head along the second maximum diameter displays a second concave curve open in the direction of the tip end, the second concave curve defining a second boundary between the second head surface and a third head surface.

2. The blind rivet of claim 1, wherein the first plan view the head outlines a semicircular shape convex towards the tip end, and wherein the second plan view the head outlines a trapezoidal shape, the trapezoidal shape having a short side at the root end and a long side at the tip end.

3. The blind rivet of claim 1, wherein the rivet head includes a pair of shoulders at the root end and extending perpendicular to the long axis from opposed sides of the shaft in the direction of the second maximum diameter, and the first head surface is one of a pair of inclined surfaces beginning at the root end and extending radially outward in the direction of the first maximum diameter and axially in the direction of the tip end.

4. The blind rivet of claim 1, wherein a third plan view of the head along the long axis outlines a circular shape.

5. The blind rivet of claim 1, wherein one or more circumferential grooves are formed in the outer peripheral surface of the sleeve at different positions axially.

6. The blind rivet of claim 1, wherein:

a horizontal first cross section through the head at a first axial position defines a first cross section perimeter length;

a second cross section through the head at a second axial position defines a second cross section perimeter length; and the first cross section perimeter length equals the second cross section perimeter length.

7. A blind rivet for use in fastening two or more components together, the blind rivet comprising:
a rivet body defining an axis and including:
a tubular sleeve, the sleeve including a first end and a second end and defining a sleeve inner diameter, and a radially outward extending flange located at the first end of the sleeve;
a mandrel including a shaft extending coaxially through the sleeve and a head connected to the shaft proximate to the second end of the sleeve, the head defining a head diameter greater than the sleeve inner diameter; and
wherein the head includes a root end adjacent to the shaft and a tip end axially opposite to the root end, and the head further includes:
beginning at the root end a first inclined planar surface extending radially outward from the shaft and axially toward the tip end, and a second inclined planar surface, opposite to the first inclined planar surface along a first diameter, extending radially outward from the shaft and axially toward the tip end; and
at the tip end a curved surface curves radially outward and axially toward the root end, and the curve surface defines an axis of curvature parallel to the first diameter.

8. The blind rivet of claim 7, wherein along a second diameter perpendicular to the first diameter the rivet head at the root end further includes a first planar shoulder and a second planar shoulder, the first planar shoulder extending from the shaft perpendicular to the axis in a first radial direction and the second planar shoulder extending from the shaft perpendicular to the axis in a second radial direction opposite to the first radial direction.

9. The blind rivet of claim 8, wherein:
a first plan view of the head appears semicircular when viewed along the first diameter, with the flat root end extending radially outward from the shaft and a rounded tip end; and
a second plan view of the head appears trapezoidal when viewed along the second diameter, with the root end flush to the shaft and a flat tip end radially longer than the root end.

10. The blind rivet of claim 7, wherein a planar view of the head appears circular when looking at the tip end as viewed along the axis of the rivet body.

11. A blind rivet for use in fastening two or more components together, the blind rivet comprising:
a rivet body defining a longitudinal axis and including; a tubular sleeve including a first end and a second end and defining a sleeve inner diameter, and a radially outward extending flange located at the first end of the sleeve; and
a mandrel including a shaft extending coaxially through the sleeve and a head located on the shaft proximate to the second end of the sleeve; and wherein the head includes:
a root end adjacent to the shaft and including a planar surface perpendicular to the longitudinal axis and facing toward the sleeve;
a tip end axially opposite to the root end and including a first curved cylindrical surface facing away from the sleeve and defining an axis of curvature, the axis of curvature perpendicular to the longitudinal axis at a point in between the root end and the tip end; and
a side surface between the planar surface of the root end and the first curved cylindrical surface of the tip end, the side surface including:
a first inclined planar surface sloping radially outward from the shaft and axially toward the tip end, and a second inclined planar surface sloping radially outward from the shaft and axially toward the tip end, the first inclined planar surface radially opposite to the second inclined planar surface along a first diameter, the first diameter parallel to the axis of curvature; and
a second cylindrical surface radially outward facing and coaxial with the longitudinal axis.

12. The blind rivet of claim 11, wherein:
a first plan view along the first diameter the head appears semicircular with the flat root end extending radially outward from the shaft and a rounded tip end; and
a second plan view along a second diameter perpendicular to the first diameter the head appears trapezoidal, with the root end flush to the shaft and a tip end longer than the root end.

13. The blind rivet of claim 11, wherein a planar view of the head appears circular when looking at the tip end as viewed along the longitudinal axis.

* * * * *